US006424826B1

(12) United States Patent
Horton et al.

(10) Patent No.: US 6,424,826 B1
(45) Date of Patent: *Jul. 23, 2002

(54) SYSTEMS AND METHODS FOR SHARING REFERENCE FREQUENCY SIGNALS WITHIN A WIRELESS MOBILE TERMINAL BETWEEN A WIRELESS TRANSCEIVER AND A GLOBAL POSITIONING SYSTEM RECEIVER

(75) Inventors: Robert Ray Horton, Apex; William O. Camp, Jr., Chapel Hill, both of NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/497,543

(22) Filed: Feb. 3, 2000

Related U.S. Application Data

(63) Continuation of application No. 08/925,566, filed on Sep. 8, 1997, now Pat. No. 6,041,222.

(51) Int. Cl.[7] ................................ H04B 1/06
(52) U.S. Cl. .................. 455/255; 455/259; 455/552; 455/314
(58) Field of Search ................ 455/255, 575, 455/259, 188.1, 86, 192.1, 427, 12.1, 13.2, 552, 314, 315; 342/357.06, 357.12; 701/213, 215

(56) References Cited

U.S. PATENT DOCUMENTS 5,119,504 A  6/1992 Durboraw, III ............ 455/575

(List continued on next page.)

FOREIGN PATENT DOCUMENTS

| EP | 0 467 651 A1 | 1/1992 |
| EP | 0 745 867 A1 | 12/1996 |
| WO | WO 96/08883 | 3/1996 |
| WO | WO 97/33382 | 9/1997 |

OTHER PUBLICATIONS

International Search Report, PCT/US98/18304, Mar. 9, 1998.

Primary Examiner—Nay Maung
Assistant Examiner—Sonny Trinh
(74) Attorney, Agent, or Firm—Myers Bigel Sibley & Sajovec

(57) ABSTRACT

A wireless mobile terminal for a wireless communication system comprises a wireless transceiver, a global positioning system (GPS) receiver, wherein the wireless transceiver and the GPS receiver share a frequency reference signal. The frequency reference signal can be multiplied by an integer multiple to create a first local oscillator for a signal conversion to an intermediate frequency for signal processing of the GPS signal. In addition, the frequency reference signal can also be divided into a lower frequency to create a second local oscillator for a conversion to a second intermediate frequency. The frequency reference signal can also be divided to create a frequency necessary for other signal processing, such as an analog-to-digital converter sampling signal at the GPS receiver. The frequency reference signal can be taken from different places within the frequency synthesis mechanism of the wireless transceiver. For example, in one embodiment the frequency reference signal is a reference oscillator signal, in another embodiment the frequency reference signal is a radio frequency signal, and in yet another embodiment the frequency reference signal is a radio frequency control signal. Frequency error can be removed from the frequency reference signal by locking to a base station carrier.

13 Claims, 16 Drawing Sheets

U.S. PATENT DOCUMENTS

| | | | |
|---|---|---|---|
| 5,379,224 A | | 1/1995 | Brown et al. ................ 701/215 |
| 5,535,432 A | * | 7/1996 | Dent .......................... 455/552 |
| 5,594,454 A | * | 1/1997 | Devereux et al. ........... 342/352 |
| 5,663,735 A | | 9/1997 | Eshenbach ................. 342/357 |
| 5,812,591 A | | 9/1998 | Shumaker et al. .......... 375/206 |
| 5,841,396 A | * | 11/1998 | Krasner ................ 342/357.02 |
| 5,903,835 A | * | 5/1999 | Dent .......................... 455/427 |
| 6,002,363 A | * | 12/1999 | Krasner ................... 342/357.1 |
| 6,041,222 A | * | 3/2000 | Horton et al. .............. 455/255 |
| 6,088,348 A | * | 7/2000 | Bell, III et al. ............. 370/343 |
| 6,097,974 A | * | 8/2000 | Camp, Jr. et al. ........... 455/575 |
| 6,188,351 B1 | * | 2/2001 | Bloebaum ............. 342/357.15 |

\* cited by examiner

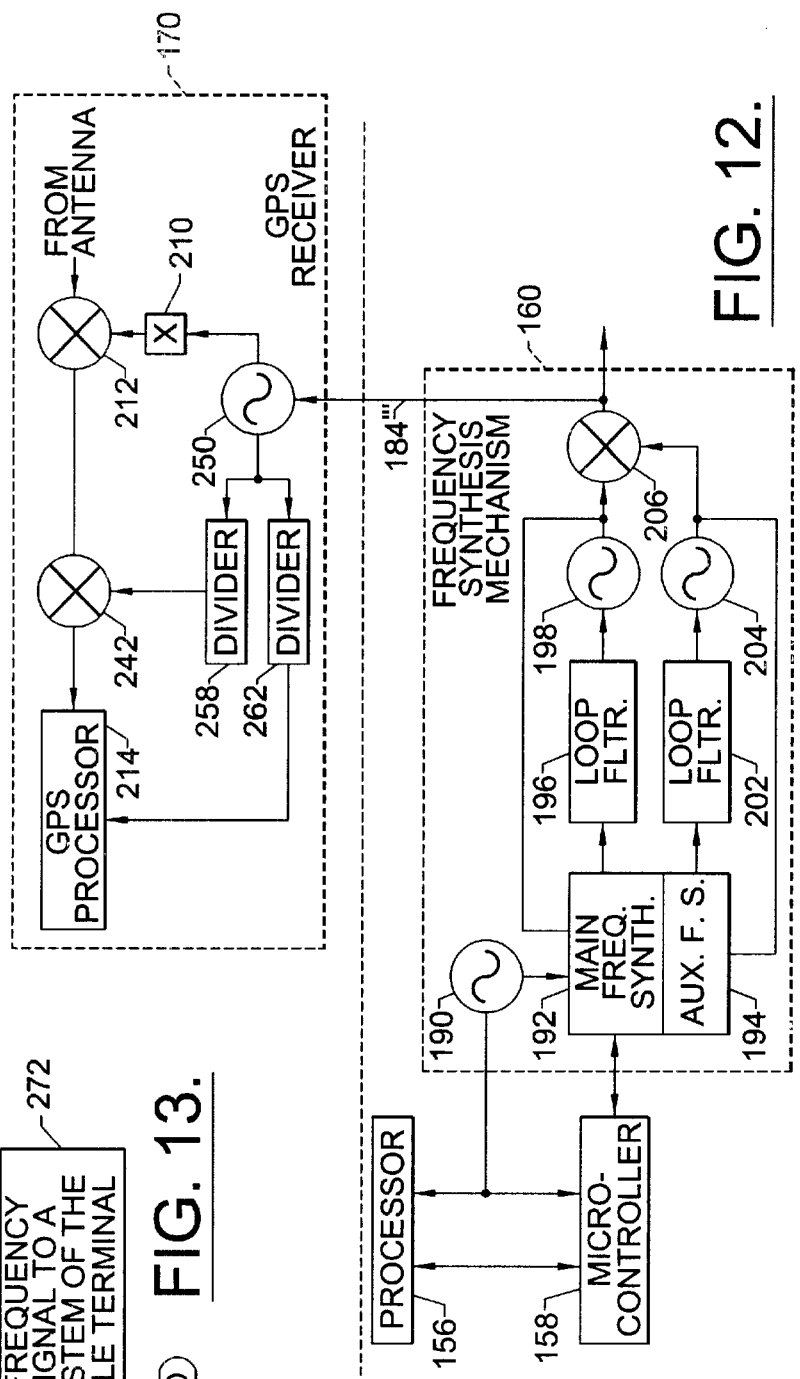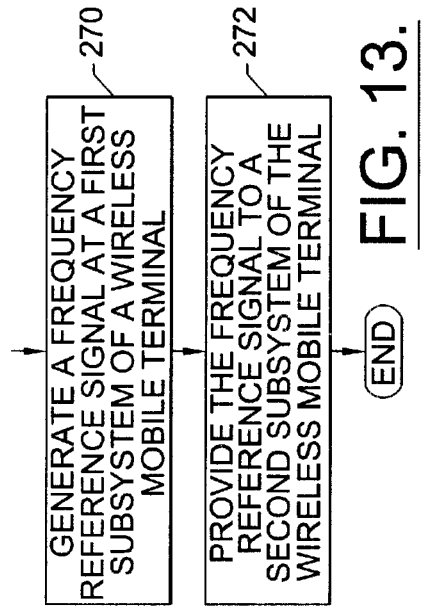

SYSTEMS AND METHODS FOR SHARING REFERENCE FREQUENCY SIGNALS WITHIN A WIRELESS MOBILE TERMINAL BETWEEN A WIRELESS TRANSCEIVER AND A GLOBAL POSITIONING SYSTEM RECEIVER

CROSS REFERENCE TO RELATED APPLICATION

This application is a continuation of U.S. application Ser. No. 08/925,566, filed Sep. 8, 1997, now U.S. Pat. No. 6,041,222.

FIELD OF THE INVENTION

The present invention generally relates to wireless communications, and more particularly, to the receivers for wireless mobile terminals of wireless communication systems.

BACKGROUND OF THE INVENTION

Wireless communication systems are commonly employed to provide voice and data communications to a plurality of subscribers within a prescribed geographic area. For example, analog cellular radiotelephone systems, such as those designated AMPS, ETACS, NMT-450, and NMT-900, have been deployed successfully throughout the world. Recently, digital cellular radiotelephone systems such as those designated IS-54B (and its successor IS-136) in North America and GSM in Europe have been introduced and are currently being deployed. These systems, and others, are described, for example, in the book entitled *Cellular Radio Systems*, by Balston, et al., published by Artech House, Norwood, Mass. (1993). In addition to the above systems, an evolving system referred to as personal communication services (PCS) is being implemented. Examples of current PCS systems include those designated IS-95, PCS-1900, and PACS in North America, DCS-1800 and DECT in Europe, and PHS in Japan. These PCS systems operate around the 2 gigahertz (GHz) band of the radio spectrum, and are typically being used for voice and high bit-rate data communications.

FIG. 1 illustrates a conventional terrestrial wireless communication system 20 that may implement any one of the aforementioned wireless communications standards. The wireless system may include one or more wireless mobile terminals 22 that communicate with a plurality of cells 24 served by base stations 26 and a mobile telephone switching office (MTSO) 28. Although only three cells 24 are shown in FIG. 1, a typical cellular radiotelephone network may comprise hundreds of cells, and may include more than one MTSO 28 and may serve thousands of wireless mobile terminals 22.

The cells 24 generally serve as nodes in the communication system 20, from which links are established between wireless mobile terminals 22 and a MTSO 28, by way of the base stations 26 servicing the cells 24. Each cell 24 will have allocated to it one or more dedicated control channels and one or more traffic channels. The control channel is a dedicated channel used for transmitting cell identification and paging information. The traffic channels carry the voice and data information. Through the communication system 20, a duplex radio communication link 30 may be effected between two wireless mobile terminals 22 or between a wireless mobile terminal 22 and a landline telephone user 32 via a public switched telephone network (PSTN) 34. The function of the base station 26 is commonly to handle the radio communications between the cell 24 and the wireless mobile terminal 22. In this capacity, the base station 26 functions chiefly as a relay station for data and voice signals.

FIG. 2 illustrates a conventional celestial wireless communication system 120. The celestial wireless communication system 120 may be employed to perform similar functions to those performed by the conventional terrestrial wireless communication system 20 of FIG. 1. In particular, the celestial wireless communication system 120 typically includes one or more satellites 126 that serve as relays or transponders between one or more earth stations 127 and satellite wireless mobile terminals 122. The satellite 126 communicates with the satellite wireless mobile terminals 122 and earth stations 127 via duplex communication links 130. Each earth station 127 may in turn be connected to a PSTN 132, allowing communications between the wireless mobile terminals 122, and communications between the wireless mobile terminals 122 and conventional terrestrial wireless mobile terminals 22 (FIG. 1) or landline telephones 32 (FIG. 1).

The celestial wireless communication system 120 may utilize a single antenna beam covering the entire area served by the system, or as shown in FIG. 2, the celestial wireless communication system 120 may be designed such that it produces multiple, minimally-overlapping beams 134, each serving a distinct geographical coverage area 136 within the system's service region. A satellite 126 and coverage area 136 serve a function similar to that of a base station 26 and cell 24, respectively, of the terrestrial wireless communication system 20.

Thus, the celestial wireless communication system 120 may be employed to perform similar functions to those performed by conventional terrestrial wireless communication systems. In particular, a celestial radiotelephone communication system 120 has particular application in areas where the population is sparsely distributed over a large geographic area or where rugged topography tends to make conventional landline telephone or terrestrial wireless infrastructure technically or economically impractical.

As the wireless communication industry continues to advance, other technologies will most likely be integrated within these communication systems in order to provide value-added services. One such technology being considered is a global positioning system (GPS). Therefore, it would be desirable to have a wireless mobile terminal with a GPS receiver integrated therein.

SUMMARY OF THE INVENTION

It is therefore an object of the present invention to provide a wireless mobile terminal having a global positioning system (GPS) receiver integrated therein and which is inexpensive to manufacture and efficient in operation.

This and other objects of the present invention are provided by a wireless mobile terminal of a wireless communication system that includes a GPS receiver integrated therein for generating position data that can be transmitted by the wireless mobile terminal. It will be understood that the terms "global positioning system" or "GPS" are used to identify any spaced-based system that measures positions on earth, including the GLONASS satellite navigation system in Europe. In the wireless mobile terminal, a wireless transceiver and a the GPS receiver share a frequency reference signal. There are several advantages to this configuration, including the reduction of duplicate components of the wireless transceiver and GPS receiver, lower power consumption because fewer parts are utilized, and enhanced performance of the GPS receiver because of the precision of the frequency reference signal.

In particular, according to the present invention, the wireless mobile terminal of a wireless communication system comprises a wireless transceiver and a GPS receiver, wherein the wireless transceiver and the GPS receiver share a frequency reference signal. The frequency reference signal is utilized by the wireless transceiver in signal demodulation and processing. Likewise, the frequency reference signal is utilized by the GPS receiver in signal demodulation and processing.

In accordance with an aspect of the present invention, the frequency reference signal shared by the wireless transceiver and the GPS receiver is a reference oscillator signal generated, for instance, by a temperature compensated reference crystal oscillator. The reference oscillator signal may be multiplied or divided by a first integer to produce a first GPS local oscillator used in signal conversion to a first intermediate frequency in the GPS receiver. Further, a second conversion stage can be incorporated in the GPS receiver by multiplying or dividing the reference oscillator signal by a second integer (which can include 1) to produce a second GPS local oscillator used in signal conversion to a second intermediate frequency in the GPS receiver. The reference oscillator signal can be further utilized at the GPS receiver by dividing or multiplying the reference oscillator signal by a third integer (which can include 1) to produce a frequency used in signal processing, for instance, as an analog-to-digital sampling signal. The wireless transceiver, on the other hand, may include a frequency synthesizer that utilizes the reference oscillator signal as a frequency reference signal. It is noted that the accuracy of the reference oscillator signal can be increased by synchronizing the reference oscillator signal with a signal from a base station of the wireless communication system, thus reducing the signal processing required for the GPS receiver.

In another aspect of the present invention, the frequency reference signal shared by the wireless transceiver and the GPS receiver is a radio frequency signal generated, for instance, by a local oscillator of the wireless transceiver. The radio frequency signal can be multiplied or divided by a first integer to produce a first GPS local oscillator used in signal conversion to a first intermediate frequency in the GPS receiver. Further, the radio frequency signal may be multiplied or divided by a second integer to produce a second GPS local oscillator used in signal conversion to a second intermediate frequency in the GPS receiver. The GPS receiver may further utilize the radio frequency signal by dividing or multiplying the radio frequency signal by a third integer to produce a frequency used in signal processing, such as an analog-to-digital sampling signal. The wireless transceiver, on the other hand, may utilize the radio frequency signal for another signal processing function within the wireless transceiver, such as but not limited to a transmit carrier signal. The radio frequency signal may be taken from the output of a frequency synthesizer of the wireless transceiver. Thus, the frequency synthesizer of the wireless transceiver may operate alternately in a wireless mode and a GPS mode.

In yet another aspect of the present invention, the frequency reference signal is a radio frequency control signal generated, for instance, by a phase locked loop circuit of the wireless transceiver. The radio frequency control signal is utilized by the GPS receiver to control the operation of a GPS local oscillator, and is used by the wireless transceiver to control the operation of a wireless transceiver local oscillator. At the GPS receiver, the GPS local oscillator outputs a GPS frequency signal that is multiplied or divided by a first integer and used in signal conversion to an intermediate frequency. Further, the GPS frequency signal may be multiplied or divided by a second integer used in signal conversion to a second intermediate frequency. The GPS frequency may also be divided or multiplied by a third integer to produce a frequency used in signal processing, for instance, as an analog-to-digital sampling signal. The cellular local oscillator, on the other hand, outputs a wireless frequency signal that is used by the wireless transceiver for another signal processing function within the wireless transceiver, such as but not limited to a transmit carrier signal. The phase locked loop circuit of the wireless transceiver may include a frequency synthesizer that operates alternately in a cellular mode and a GPS mode.

In yet another aspect of the present invention, a method for sharing a frequency reference signal between a wireless transceiver and a GPS receiver in a wireless mobile terminal comprises the steps of generating a frequency reference signal by said wireless transceiver, and providing the frequency reference signal to said GPS receiver.

In addition, the above method can include the step of multiplying the frequency reference signal by an integer value for use in signal processing at the second subsystem. Similarly, the above method can include the step of dividing the frequency reference signal by an integer value for use in signal processing at the second subsystem. Further, the above method can include the step of alternating the operation of the frequency synthesis mechanism between a wireless transceiver mode and a GPS mode.

Accordingly, it can be readily appreciated that a wireless mobile terminal of the present invention will have numerous advantages, a few of which are delineated below.

First, a wireless mobile terminal in accordance with the present invention would be particularly advantageous in tracking articles using wireless communication systems which are fairly ubiquitous. Examples of articles that can be tracked in such a manner include railroad boxcars, barges, or trucks used in transporting goods, stolen automobiles, and persons. By placing a call to the wireless mobile terminal with a request for position data set forth in a predefined format, the wireless mobile terminal can gather such information from the associated GPS receiver and transmit the position data back to the requesting entity. This feature may be particularly desirable in combination with a telemetry system, as will be appreciated by those knowledgeable in the many applications of telemetry.

Second, the wireless mobile terminal would be particularly advantageous in the provision of enhanced 911 (E911) services. An E911 system that includes a GPS receiver would be advantageous in many situations, such as in an automobile accident wherein a 911 call is automatically initiated so that the occupants of the automobile can communicate their condition and request appropriate assistance. In such a circumstance, the location of the automobile may also be sent automatically to the 911 operator in order to minimize the response time and to locate the accident scene if the occupants are unconscious or unable to effectively communicate their location to the 911 operator.

Third, a wireless mobile terminal in accordance with the present invention would be particularly advantageous in allocating resources of a wireless communication network since the location of the user is known. For example, in a celestial wireless communication system, a satellite could use pencil beams for transmitting signals to a wireless mobile terminal rather than transmitting to a relatively large area. This would result in reduced energy consumption by a satellite and greater spectral re-use of the available frequency band. The same results of reduced energy consumption and greater spectral re-use can also be realized in a terrestrial wireless communication system wherein the location of a user within a cell is known.

Fourth, a wireless mobile terminal in accordance with the present invention would be particularly advantageous in that it has a reduced number of duplicate components, and thereby, has a lower cost, consumes less power, and is smaller.

Other features and advantages of the present invention will become apparent to one with skill in the art upon examination of the following drawings and detailed description. It is intended that all such additional features and advantages be included herein in the scope of the present invention, as defined by the appended claims.

BRIEF DESCRIPTION OF THE DRAWINGS

FIG. 12 is a schematic block diagram of the functional components of a wireless mobile terminal in accordance with the third embodiment of the present invention, wherein a dual-conversion GPS receiver is shown; and FIG. 13 is a flowchart of the operation of a wireless mobile terminal in accordance with the present invention.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The elements of the drawings are not necessarily to scale, emphasis instead being placed upon clearly illustrating the principles of the present invention. Furthermore, like reference numbers refer to like elements throughout.

I. System Architecture

Figure 1:
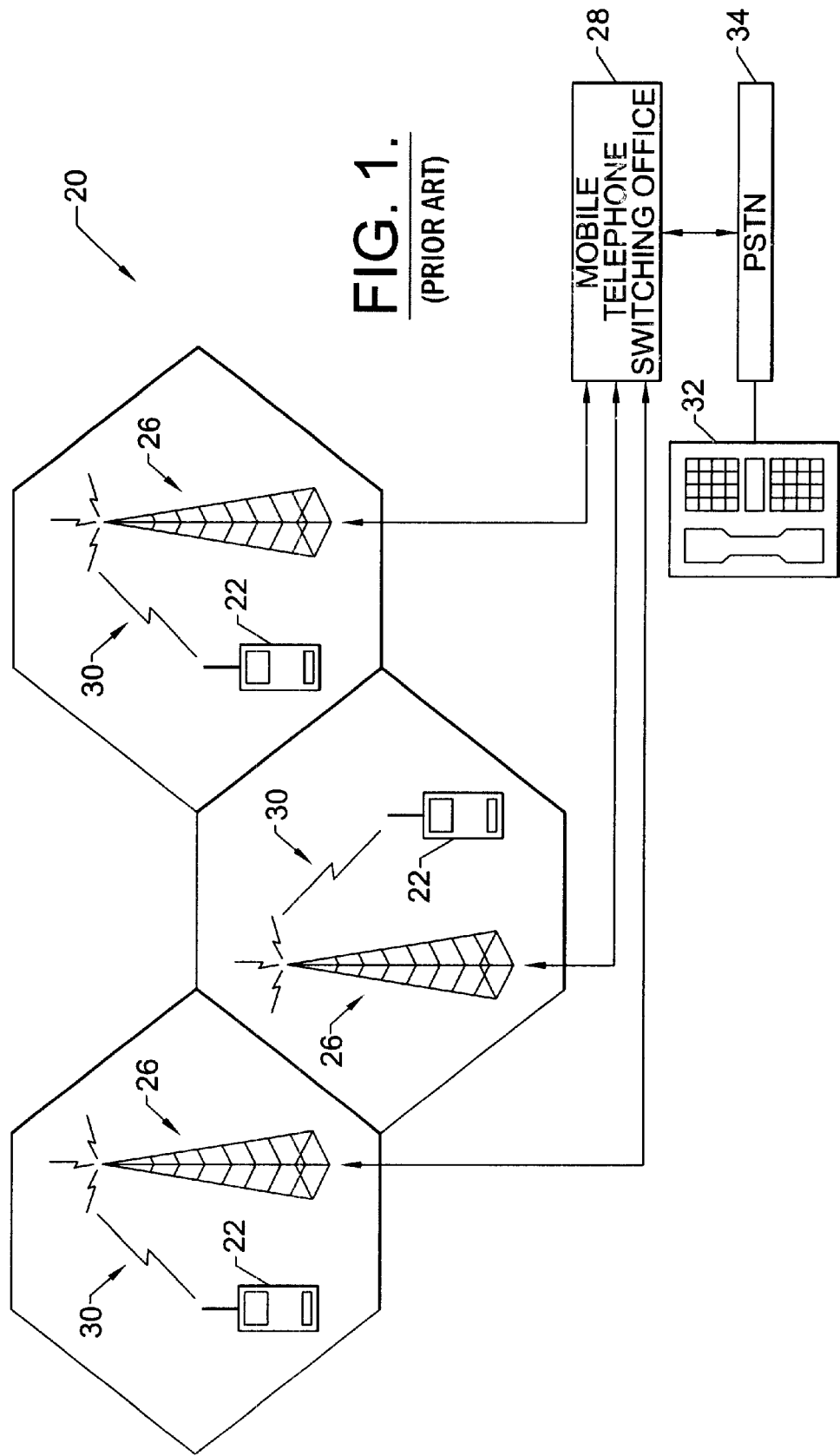
FIG. 1 illustrates a terrestrial wireless communication system according to the prior art.
Figure 2:
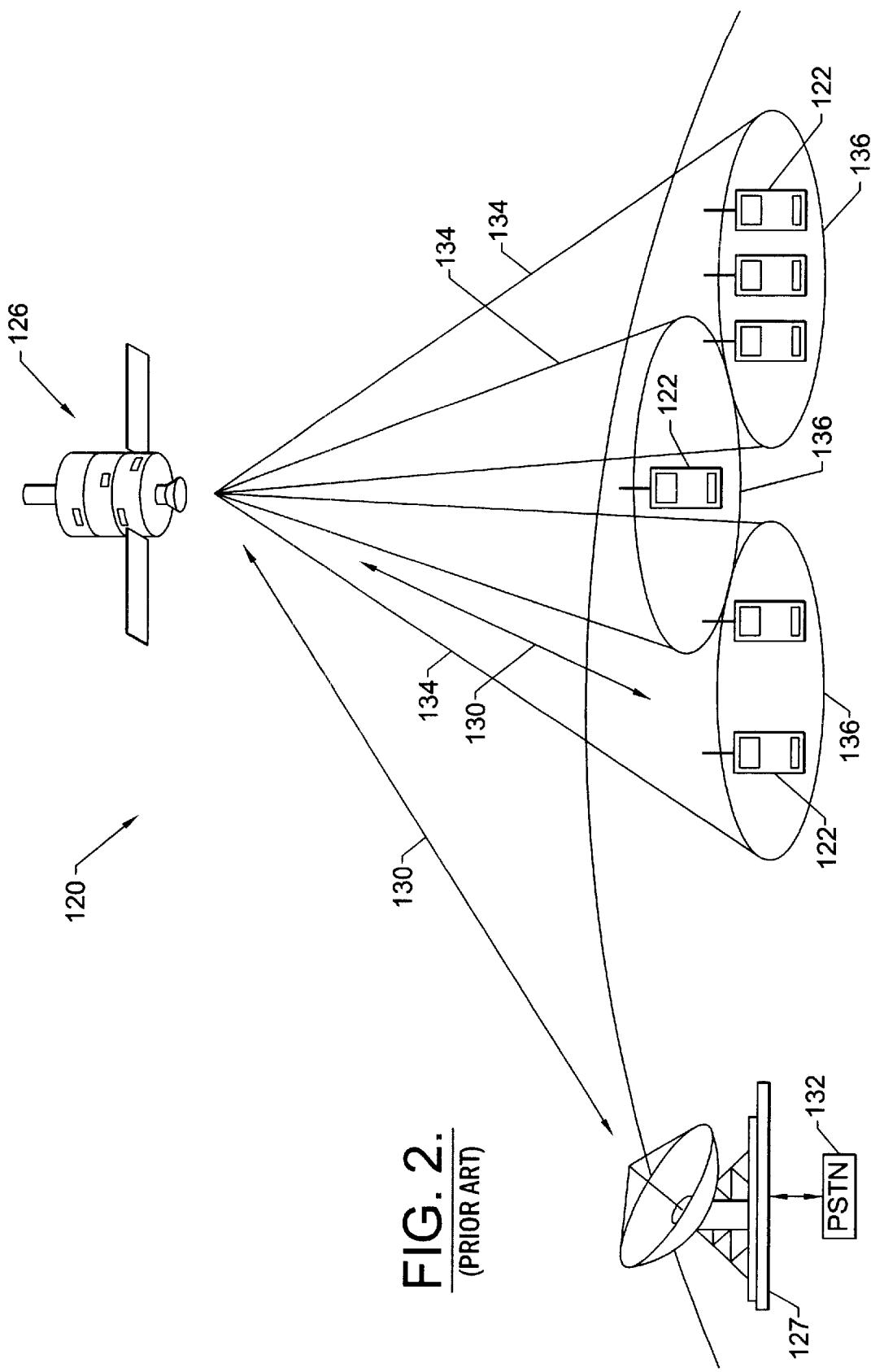
FIG. 2 illustrates a celestial wireless communication system according to the prior art.
Figure 3:
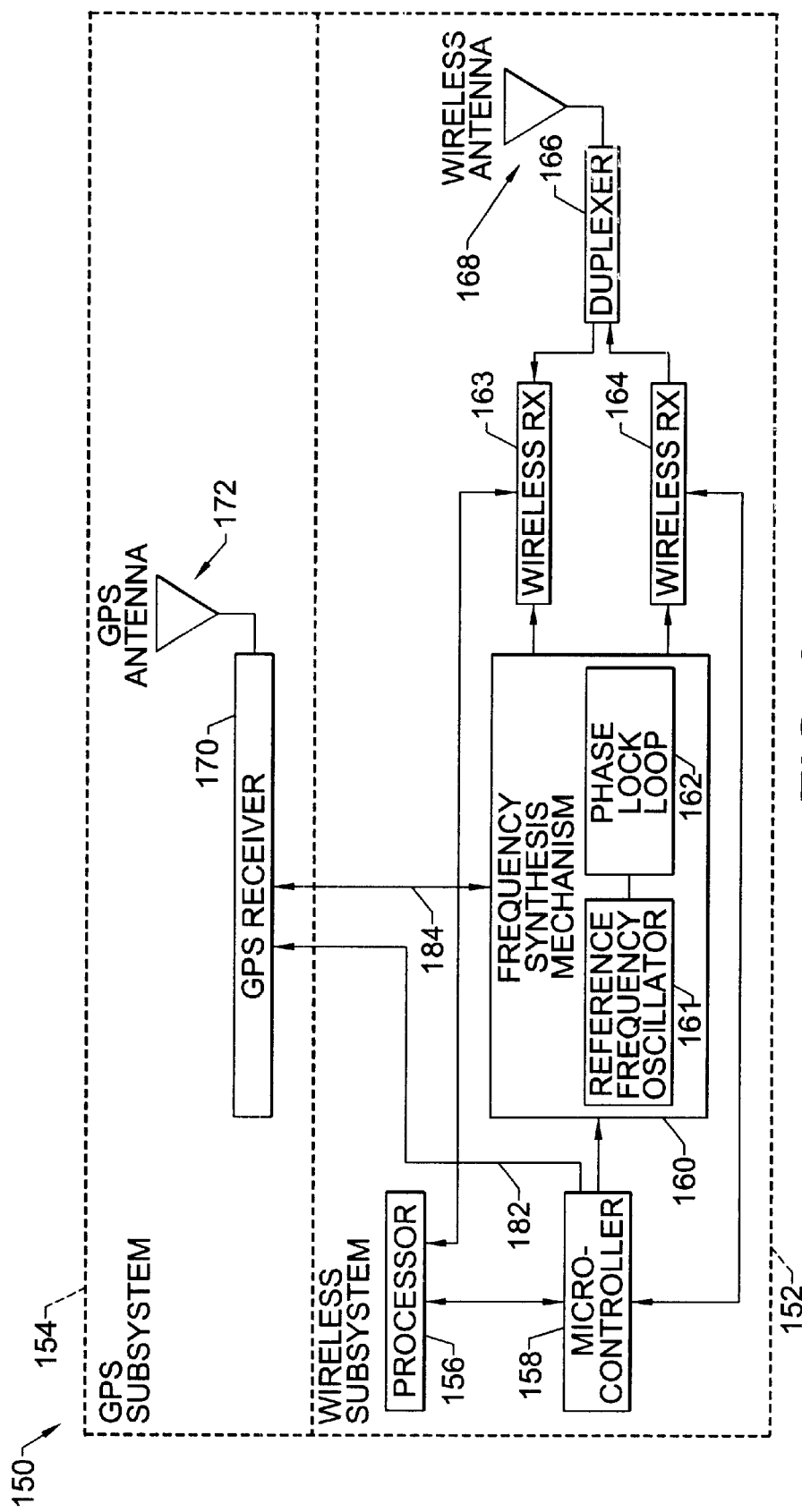
FIG. 3 is a schematic block diagram illustrating the functional components of a wireless mobile terminal in accordance with the present invention.

With reference to FIG. 3, a wireless mobile terminal 150 in accordance with the present invention is illustrated. The terminal 150 includes a wireless communication subsystem 152 and a global positioning system (GPS) subsystem 154. The wireless communication subsystem 152 may be particularly configured for operation as a wireless transceiver in essentially any of the type wireless communication networks. For instance, the wireless communication subsystem 152 may be configured for operating in a terrestrial or celestial wireless network such as the ones discussed in the Background section and illustrated in FIGS. 1 and 2, including cellular (digital or analog), or personal communications systems (PCS). This includes digital systems configured for operation as local-area networks or wide-area networks. Therefore, the wireless communication subsystem 152 is merely illustrative of the types suitable for operation in accordance with the present invention, as would be evident to one of ordinary skill in the art upon reading the present disclosure.

Figure 14:
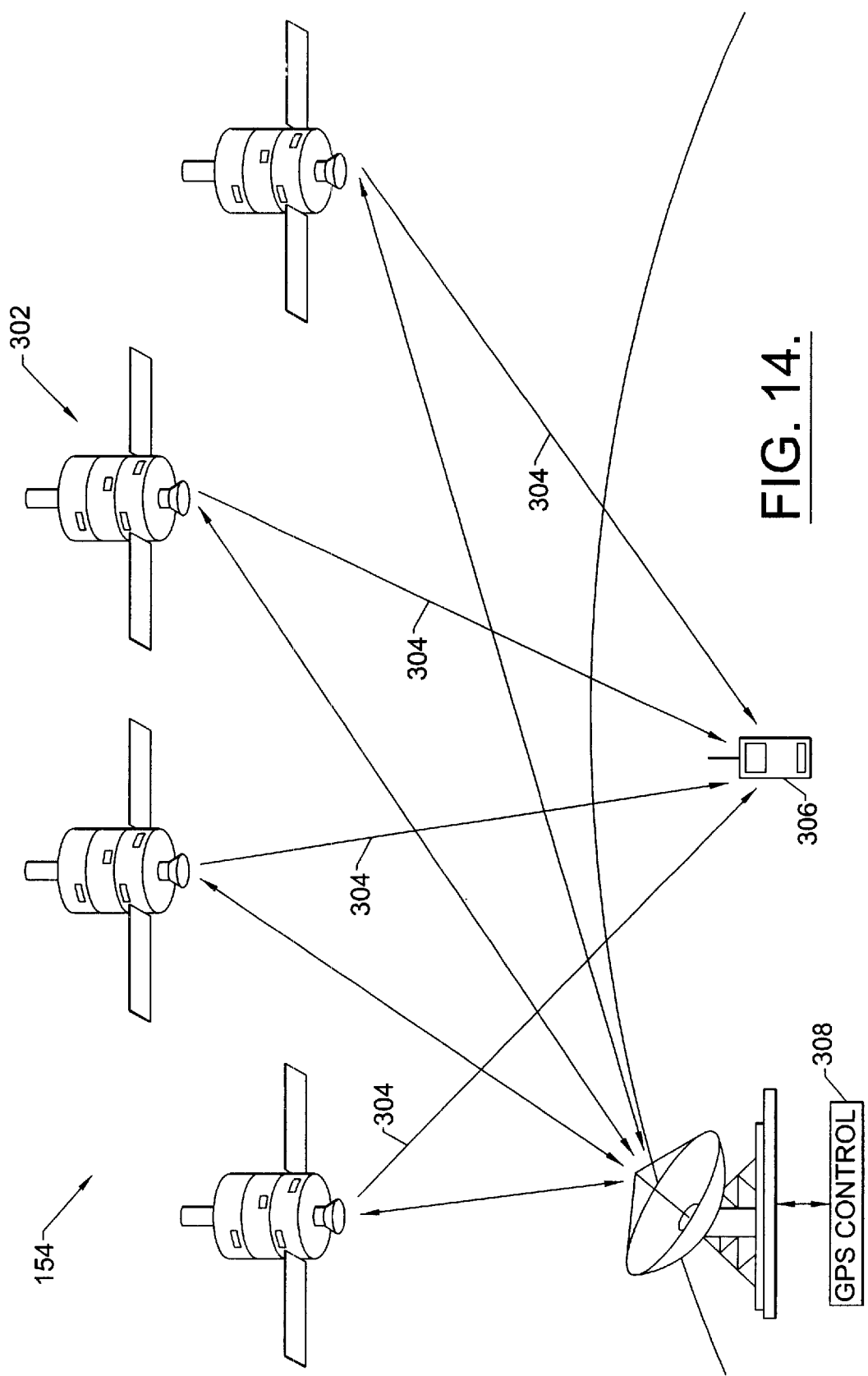
FIG. 14 illustrates a global positioning system (GPS).

The GPS subsystem 154 is configured to operate in conjunction with the global navigational system referred to as GPS, as well known to those skilled in the art. Briefly, as illustrated in FIG. 14, GPS is a space-based triangulation system using satellites 302 and computers 308 to measure positions anywhere on the earth. GPS was first developed as a defense system by the United States Department of Defense as a navigational system. The advantages of this navigational system over other land-based systems are that it is not limited in its coverage, it provides continuous 24-hour coverage, regardless of weather conditions, and is highly accurate. While the GPS technology that provides the greatest level of accuracy has been retained by the government for military use, a less accurate service has been made available for civilian use. In operation, a constellation of 24 satellites 302 orbiting the earth continually emit a GPS radio signal 304. A GPS receiver 306, e.g., a hand-held radio receiver with a GPS processor, receives the radio signals from the closest satellites and measures the time that the radio signal takes to travel from the GPS satellites to the GPS receiver antenna. By multiplying the travel time by the speed of light, the GPS receiver can calculate a range for each satellite in view. From additional information provided in the radio signal from the satellites, including the satellite's orbit and velocity, the GPS processor can calculate the position of the GPS receiver through a process of triangulation.

The wireless communication subsystem 152 comprises a processor 156 for performing processing functions such as channel coding and interleaving, encryption, modulation/demodulation, and digital/analog conversion. The processor 156 is connected to a microcontroller 158 that controls the operation of the wireless communication subsystem 152, including the operation of a processor 156. The wireless communication subsystem 152 further includes a frequency synthesis mechanism 160 which performs frequency synthesis functions for the generation of transmit carriers, receiver local oscillators, and other frequencies necessary for operation of the wireless communication subsystem 152. The frequency synthesis mechanism comprises a frequency reference oscillator 161 and a phase locked loop circuit 162, as discussed in greater detail below with respect to the different embodiments. Connected to the frequency synthesis mechanism 160 are a radio frequency transmitter 163 and a radio frequency receiver 164 for performing signal translation from a baseband frequency to a radio frequency carrier and from a radio frequency carrier to a baseband frequency, respectively. A duplexer 166 isolates the transmit and receive signals on a wireless antenna 168. Again, it is noted that the components of the wireless communication subsystem 152 described herein are merely illustrative of the components found in a wireless mobile terminal in a wireless communication network, and should not be considered limiting with respect to the scope of the present invention.

The GPS subsystem 154 includes a GPS receiver 170 and a GPS antenna 172. The GPS receiver 170 is connected to the wireless communication subsystem 152 by a link 182 that is connected to the microcontroller 158, and a link 184 that is connected to the frequency synthesis mechanism 160. For purposes of brevity, it is generally noted that the GPS receiver 170 is interconnected to the microcontroller 158 in order to integrate the functionality of the GPS receiver with a mobile wireless terminal, and to enable sharing of components between the wireless mobile terminal 150 and the GPS receiver 170 such as a keypad (not shown), display (not shown), and processor 156.

Of particular relevance to the present invention, the link 184 interconnects the frequency synthesis mechanism 160 and the GPS receiver 170, whereby the GPS receiver 170 and the frequency synthesis mechanism 160 can share a frequency reference signal for use in processing and modulating signals by either subsystem 152, 154. In essence, the present invention provides for the sharing of the frequency synthesis functions such as generating transmit carriers, receive local oscillators, and other frequencies, when the two subsystems 152, 154 are integrated into a single wireless mobile terminal 150 in order to prevent the unnecessary duplication of components. This results in reduced cost, less circuit board area, fewer circuit components, and lower power consumption. Though the frequency reference signal is generated by the wireless communication subsystem 152 in each of the following embodiments, it is noted that the frequency reference signal could have been generated by the frequency synthesis circuitry of the GPS receiver 170 and provided to the wireless communication subsystem.

In the following embodiments, the frequency reference signal is taken from different points in the circuitry comprising the frequency synthesis mechanism 160. For example, in one embodiment, the frequency reference signal is a reference oscillator signal generated by the frequency reference oscillator. In another embodiment, the frequency reference signal is a radio frequency signal generated by the phase locked loop circuit 162 of the frequency synthesis mechanism 160. In yet another embodiment, the frequency reference signal is a radio frequency control signal provided to a GPS oscillator in the GPS receiver 170.

A. Reference Oscillator Signal Embodiment

Figure 4:
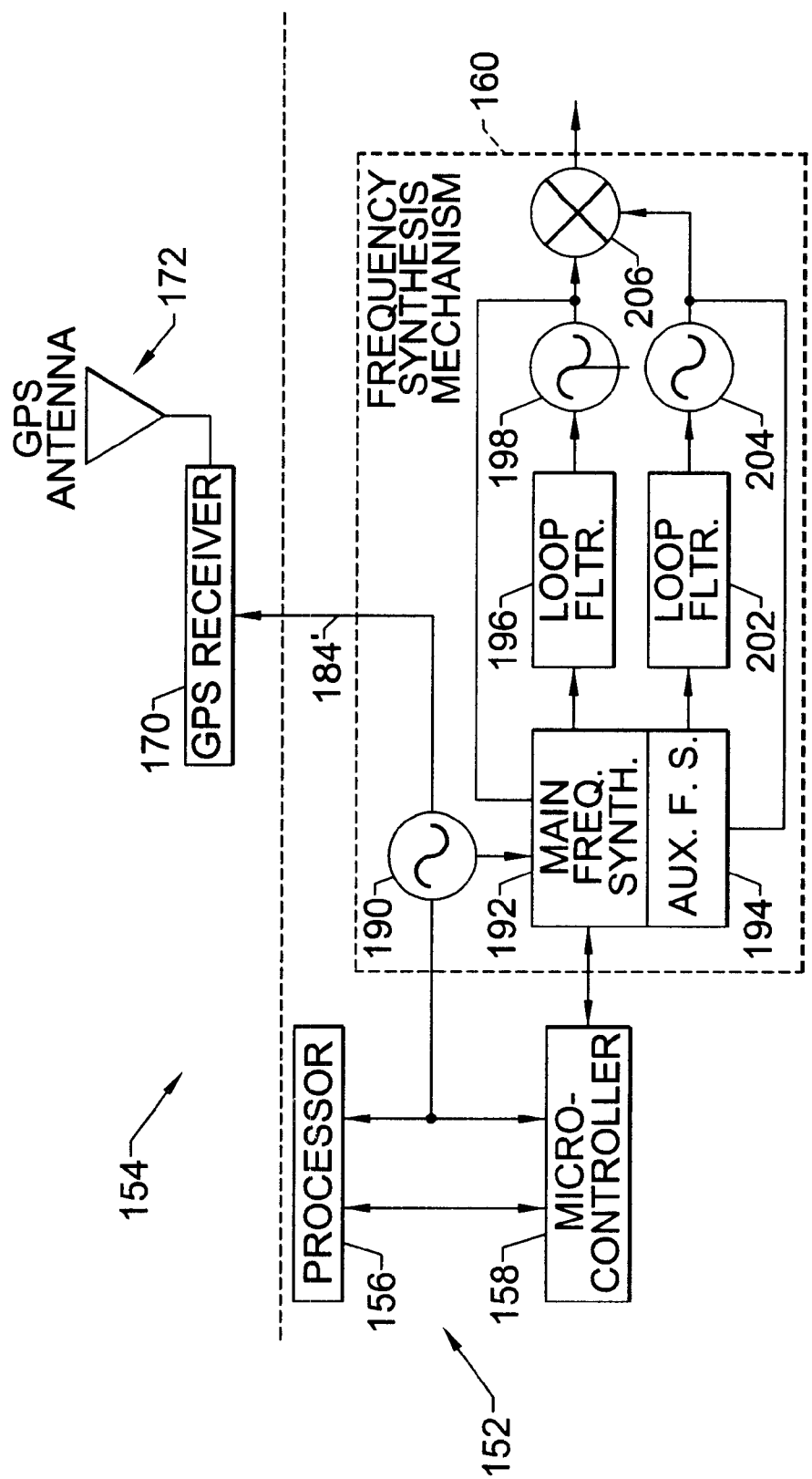
FIG. 4 is a schematic block diagram illustrating the functional components of a first embodiment of a wireless mobile terminal in accordance with the present invention.

In this embodiment of the present invention, the frequency reference signal is a reference oscillator signal generated by a frequency reference oscillator 190 of the frequency synthesis mechanism 160, as illustrated in FIG. 4. The reference oscillator signal is provided to the GPS receiver 170 via link 184'. The frequency reference oscillator 190 may also be used to clock the processor 156 and the microcontroller 158, and to provide a stable reference to one or more frequency synthesizers 192, 194. The frequency synthesizers 192, 194 in turn use this stable reference frequency to synthesize other frequencies that are used for signal processing in the wireless mobile terminal 150. Preferably, the frequency reference oscillator 190 is implemented by a voltage controlled, temperature compensated reference crystal oscillator. A particular advantage of this embodiment, as well as the other embodiments discussed hereafter, is that the potential frequency error in the frequency reference oscillator 190 can be significantly reduced when the wireless communication subsystem 152 frequency locks to the potentially very accurate carrier signal 30, 130 from a base station of the wireless communication system 20, 120. An advantage is that once the wireless communication subsystem 152 has reduced the frequency error in the reference frequency oscillator, the GPS subsystem can in turn reduce the amount of signal processing which is required to demodulate the GPS signals from the GPS satellite constellation. In turn, the reduction of the required signal processing can result in a faster position solution and less power consumption.

In this embodiment, the frequency synthesis mechanism 160 further includes a first loop filter 196 and a first voltage control oscillator (VCO) 198 which comprise a phase locked loop circuit in conjunction with the main frequency synthesizer 192. A second phase locked loop circuit is formed by the auxiliary frequency synthesizer 194, a second loop filter 202 and a second VCO 204. The radio frequency signal output of the two phase locked loops are combined by a mixer 206 in order to correct for load pulling and high frequency feedback from other electrical components in the wireless mobile terminal 150.

The GPS receiver 170 can utilize the reference oscillator signal in a variety of ways for signal processing. For instance, the reference oscillator signal can be used by the GPS receiver 170 as a stable oscillator for producing a reference signal utilized by a frequency synthesis circuit in the GPS receiver 170. "Stable" in this context means that the frequency of the reference oscillator signal does not vary significantly with battery voltage, temperature, humidity, etc. Therefore, the reference oscillator signal eliminates the need for a frequency reference oscillator dedicated to the GPS receiver 170. If necessary, the frequency reference signal can be integer multiplied or divided to achieve the frequency desired at the GPS receiver 170.

Figure 5:
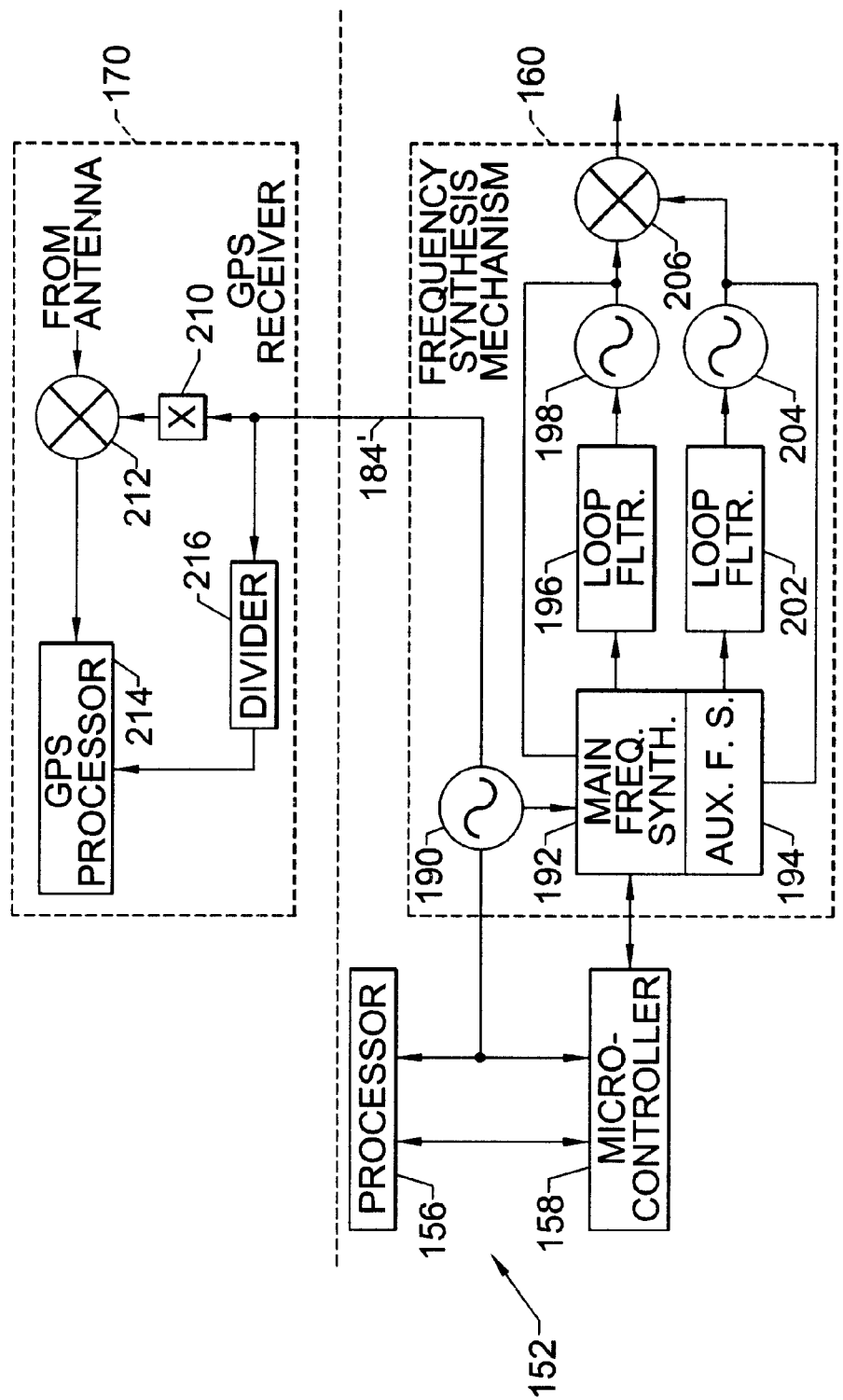
FIG. 5 is a schematic block diagram illustrating a signal conversion GPS receiver in accordance with the first embodiment of FIG. 4.

Alternatively, as illustrated in FIG. 5, the reference oscillator signal may be multiplied by an integer multiple at block 210 to create a first local oscillator for converting the incoming signal to an intermediate frequency at mixer 212. The intermediate frequency signal is then sent to a GPS processor 214 where the signal is processed in order to derive location data. It should be noted at this point that the operations of the GPS processor 214 may be integrated into processor 156 of the wireless communication subsystem 152 in order to eliminate the need for the GPS processor 214. Further, the reference oscillator signal on link 184' may be divided at block 216 to create a frequency necessary for other signal processing, such as but not limited to an analog-to-digital converter sampling signal.

Figure 6:
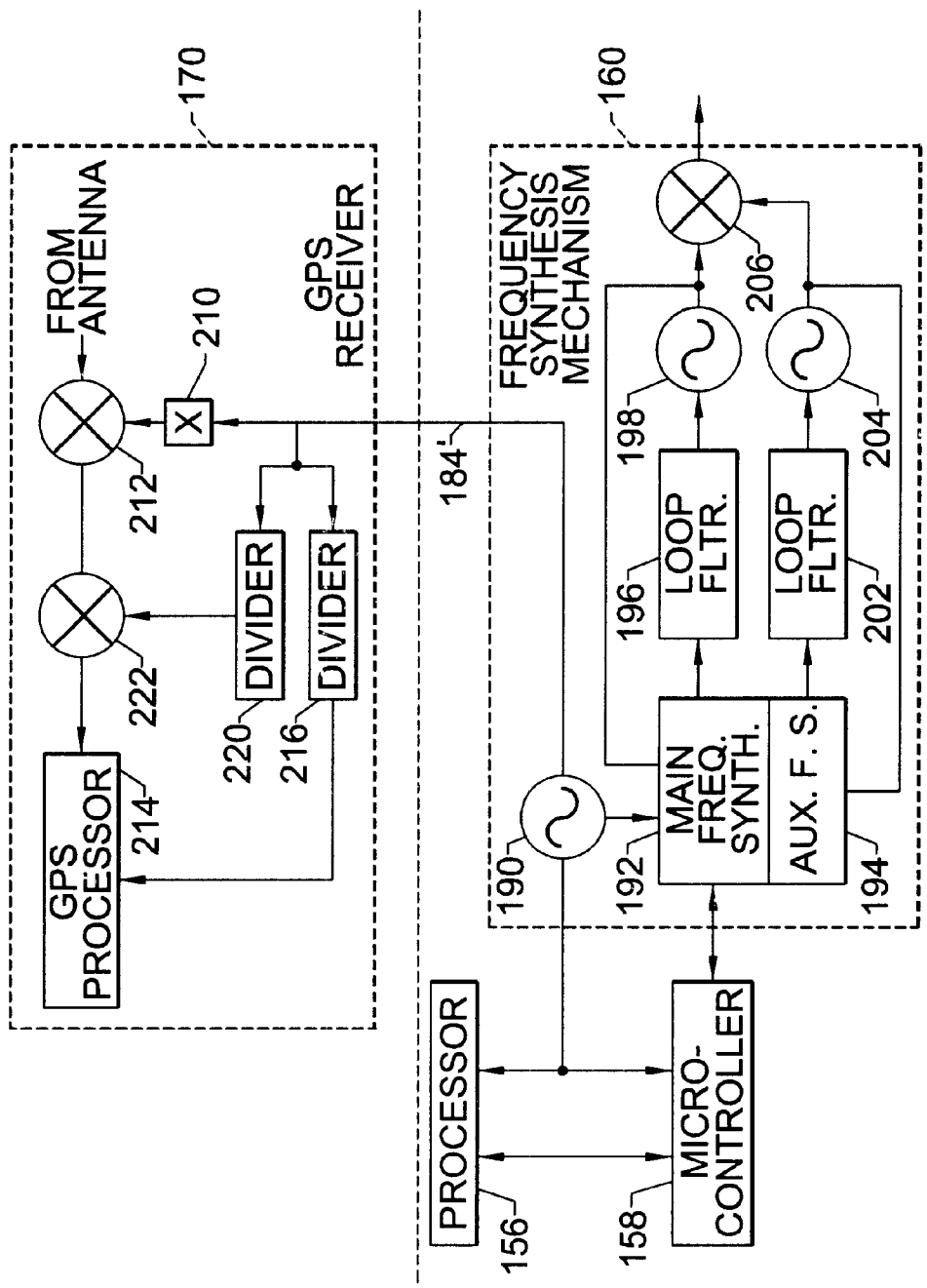
FIG. 6 is a schematic block diagram illustrating a dual-conversion receiver with a GPS receiver in accordance with the first embodiment of FIG. 4.

Yet further, as illustrated in FIG. 6, the reference oscillator signal on link 184' can be divided at block 220 to create a second local oscillator frequency which can then be mixed with the first intermediate frequency in mixer 222, to create a second intermediate frequency for signal processing. This configuration of the GPS receiver 170 is referred to as a dual-conversion receiver. This configuration is particularly advantageous due to the fact that in a dual conversion receiver, the first intermediate frequency can be higher in frequency, allowing the first local oscillator signal (created by integer divider 210) to be a frequency further away from the frequency of the desired RF signal. The result is that undesirable RF image frequencies (that are also mixed with the local oscillator down to the intermediate frequency) are further away in frequency from the desired RF signal. Thus, the undesirable RF image frequencies can be filtered by cheaper, more realizable filters.

B. Radio Frequency Signal Embodiment

Figure 7:
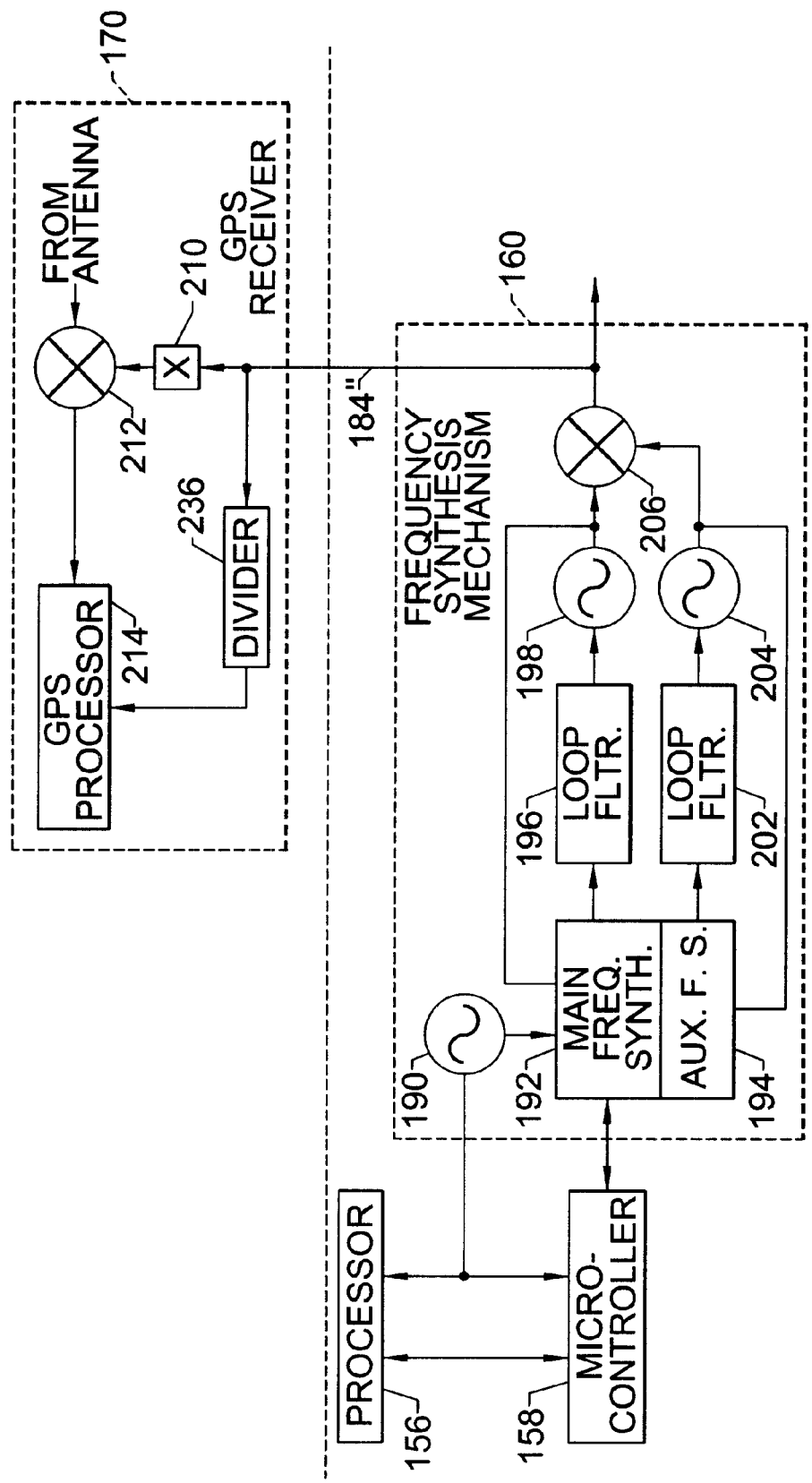
FIG. 7 is a schematic block diagram illustrating the functional components of a wireless mobile terminal in accordance with the second embodiment of the present invention wherein a signal conversion GPS receiver is shown.

In this embodiment of the present invention, the frequency reference signal is a radio frequency signal provided to the GPS receiver 170 on link 184", as shown in FIG. 7. This configuration is particularly advantageous in cellular communication networks because the radio frequency signal generated by the frequency synthesis mechanism 160 is approximately 800–1000 megahertz (MHZ) and the carrier frequency for GPS signals is approximately 1.5–2.0 gigahertz (GHz). Thus, the radio frequency signal on link 184" can be multiplied by the integer 2 at block 210 in order to create a first local oscillator for combining with the received GPS signal at mixer 212 for a single conversion to an intermediate frequency for signal processing at GPS processor 214. However, as would be obvious to one skilled in the art, integer values other than 2 may be used at block 230 depending upon numerous factors such as the number of conversions in the GPS receiver 170, the carrier frequency of the GPS signal, and the frequency of the radio frequency signal on link 184". The radio frequency signal on link 184" may also be divided at block 236 to create a frequency necessary for other signal processing, such as but not limited to an analog-to-digital converter sampling signal. It should also be noted that the radio frequency signal on link 184" may be taken from the output of either VCO 198 or VCO 204 rather than from the output of mixer 206.

In this case, the frequency synthesizers 192 and 194 use the stable reference frequency 190 to precisely synthesize the frequencies by a voltage controlled, temperature compensated reference crystal oscillator, the potential frequency error in the reference frequency oscillator 190 can be significantly reduced when the wireless communication subsystem 152 frequency locks to the potentially very accurate carrier signal 30, 130 from a base station of the wireless communication system 20, 120. An advantage is that once the wireless communication subsystem 152 has reduced the frequency error in the reference frequency oscillator, the frequency error is subsequently reduced in VCO 198 and VCO 204. If the GPS subsystem uses these corrected frequency signals, the GPS subsystem can in turn reduce the amount of signal processing required to demodulate the GPS signals from the GPS satellite constellation. In turn, the reduction of the required signal processing can result in a faster position solution and less power consumption.

Figure 8:
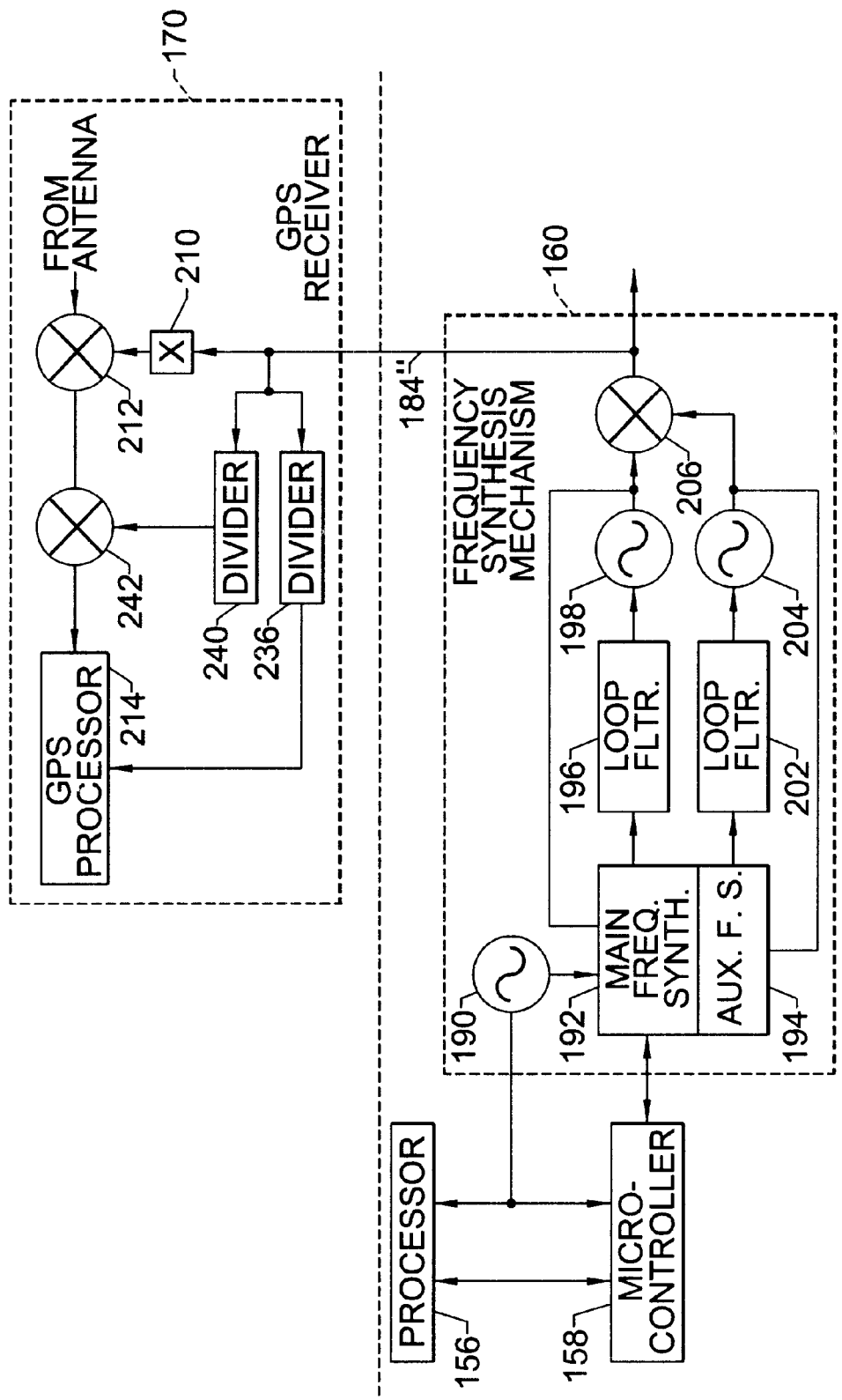
FIG. 8 is a schematic block diagram illustrating a wireless mobile terminal including a dual-conversion GPS receiver in accordance with the second embodiment of the present invention.

As with the previous embodiment and as shown in FIG. 8, the GPS receiver 170 may be configured as a dual-conversion receiver wherein the radio frequency signal on the link 184" is divided at the block 240 to a lower frequency to create a second local oscillator for a conversion at mixer 242 to a second intermediate frequency for signal processing. At second block 236, the radio frequency signal on link 184" is divided to create a frequency necessary for other signal processing, such as but not limited to an analog-to-digital converter sampling signal.

Figure 9:
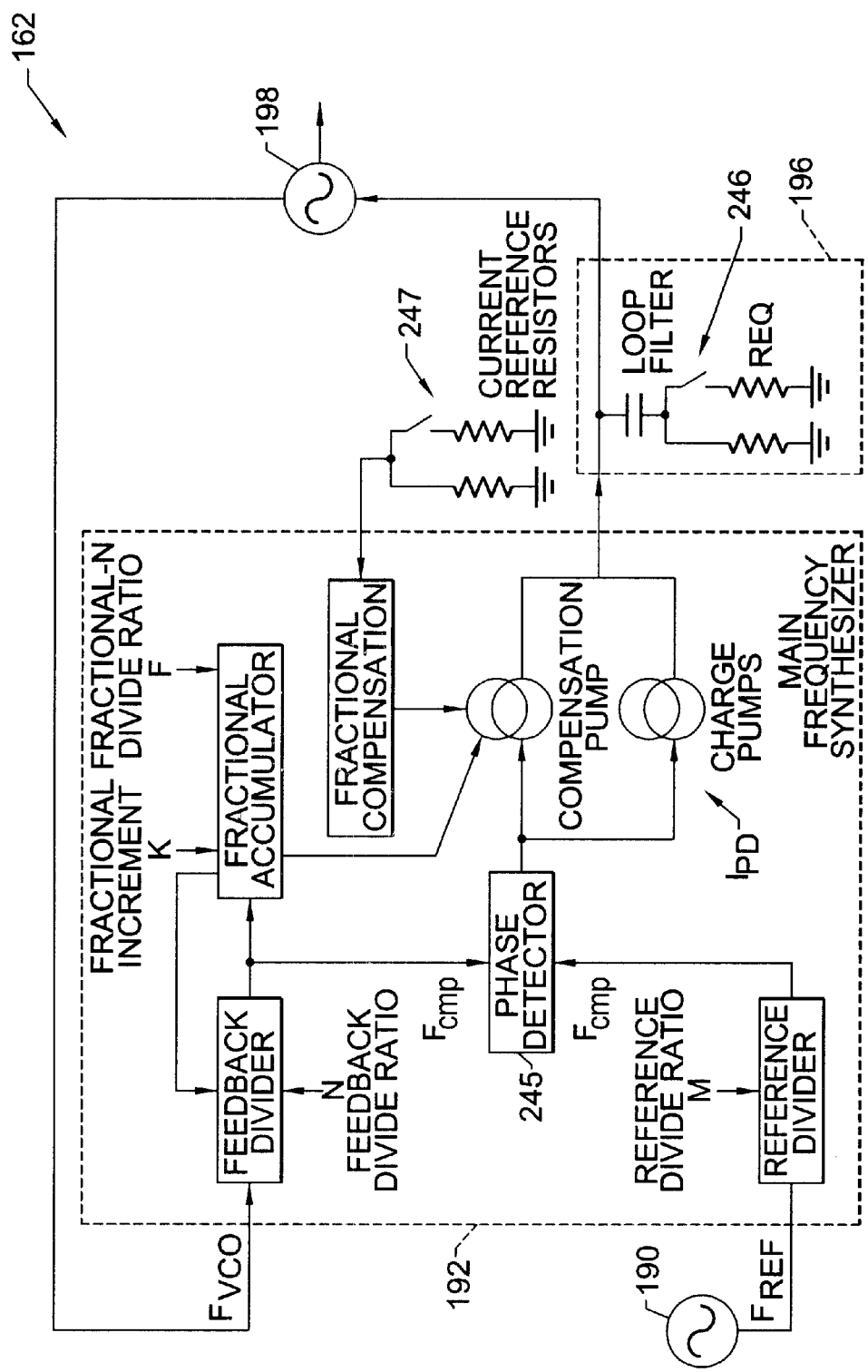
FIG. 9 is a schematic block diagram illustrating a phase locked loop circuit in accordance with the present invention.

In this embodiment, the radio frequency signal supplied to the GPS receiver 170 over link 184" is generated by the phase lock loop (PLL) circuit 162 of the frequency synthesis mechanism 160, where the PLL circuit 162 comprises, for instance, the main frequency synthesizer 192, the loop filter 196, and the VCO 198, as shown in FIG. 9. In accordance with a feature of the present invention, PLL circuit 162 is a dual mode device that actively alternates between operation in a GPS mode and a wireless transceiver mode, as necessary. Consequently, the main frequency synthesizer 192 of the PLL circuit 162 is actively reprogrammed between the wireless transceiver mode and the GPS mode, which can change the loop response of the PLL circuit 162. Examples of the changes made when reprogramming the main frequency synthesizer 192 from the wireless transceiver mode to the GPS mode include a change of the divide ratios N and M and/or a change of the fractional-N ratio F and fractional increment K for generating a different comparison frequency in the digital phase detector 245. To compensate for the resulting changes in the loop response, aspects of the PLL circuit 162, such as the phase detector gain ($I_{PD}$) or the loop filter characteristics (via switch 246), can be changed to achieve the desired loop response. Thus, the desired phase margin (or dampening factor) and PLL loop bandwidth can be substantially maintained.

Figure 15:
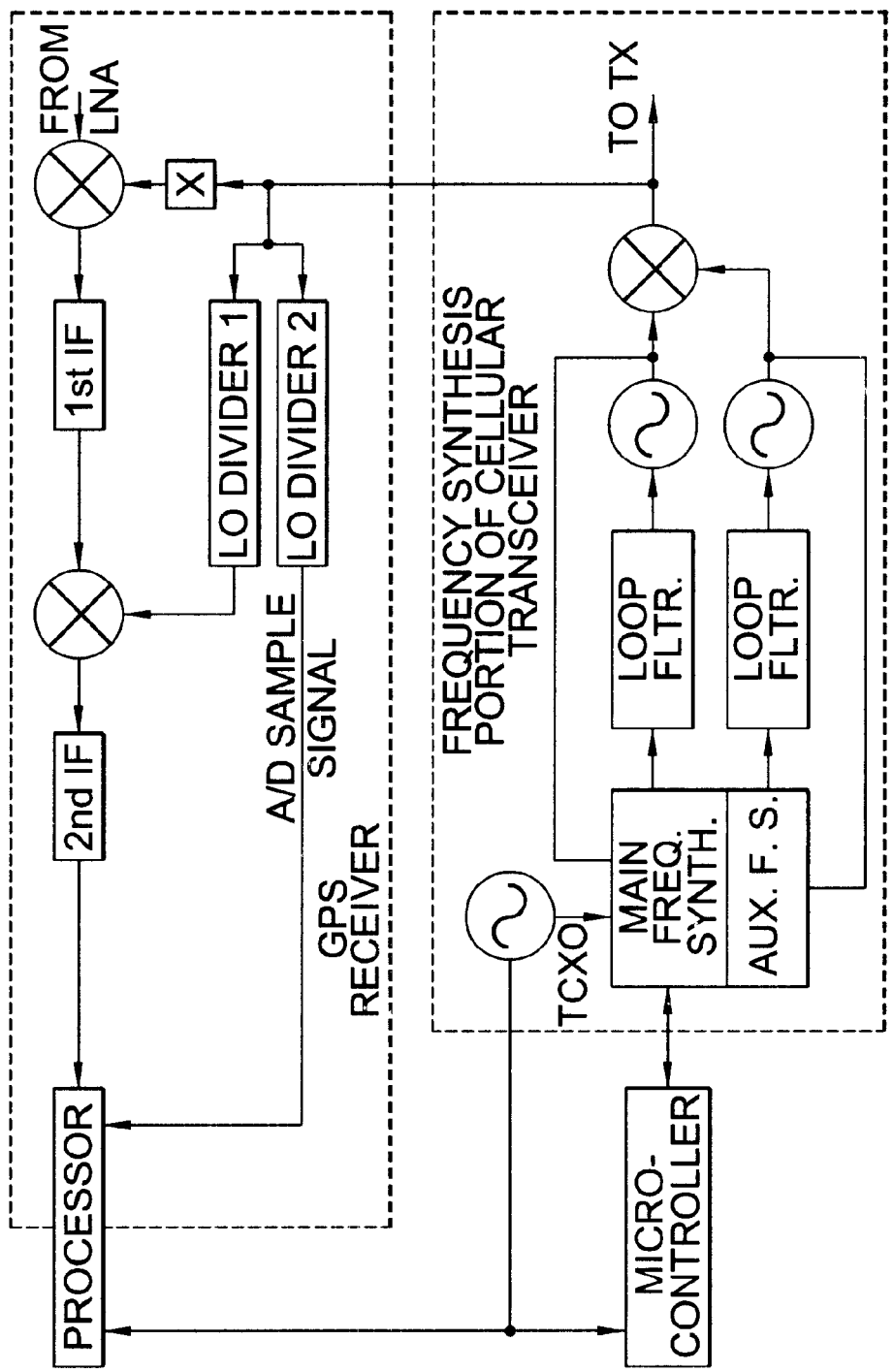
FIG. 15 is a schematic block diagram of an example of a wireless mobile terminal in accordance with FIG. 8.

Examples of the embodiment just described are provided in FIGS. 15 and 16. In FIG. 15, a radio frequency signal is generated by mixing the output of the main synthesizer VCO (Cellular Mode: 979.56 MHz, GPS Mode: 978.012 MHZ) with the output of the auxiliary synthesizer VCO (155.52 MHz) to create a transmit carrier (824.04 MHz) for the cellular mode, or a first local oscillator signal for the GPS receiver (2×[978.012−155.52]=1644.984 MHz) in the GPS mode located at 1575.42 MHz, the resulting intermediate frequency is 1644.984−1575.42=69.564 MHz. A second intermediate frequency of 1.023 MHZ is created by the LO divider 1 (divide ratio of 12) and a mixer. An analog-to-digital sampling frequency of 4.992 MHz is created by LO divider 2 (divide ratio of 201).

Figure 16A:
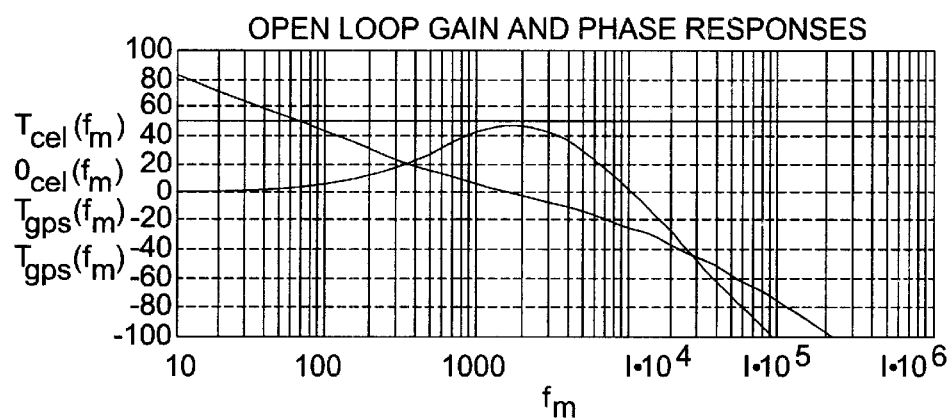
FIGS. 16A and 16B graphically illustrate open loop and closed loop response for the embodiment of FIG. 15.
Figure 16B:
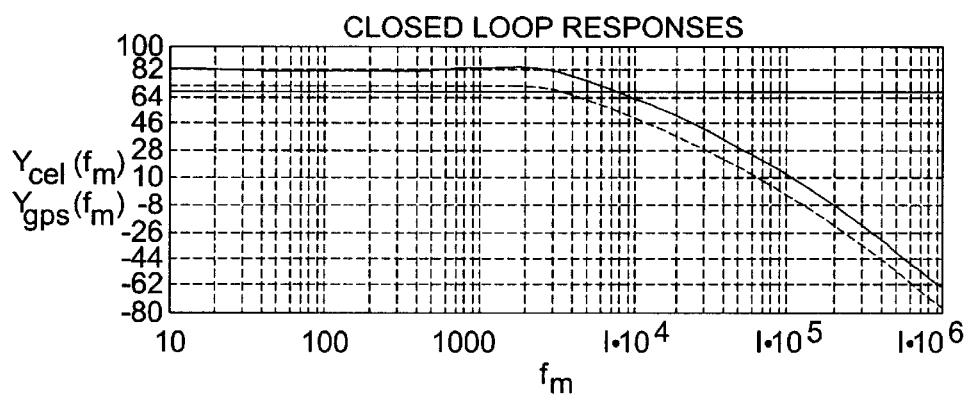

FIG. 16 is an example of maintaining the desired phase lock loop dynamics (lock time, overshoot, etc.) When switching between the cellular and the GPS modes. Referring to the figure, the dual mode frequency synthesizer is switched from the cellular mode to the GPS mode by reprogramming the feedback divide ratio (N), the fractional-N divide ratio (F), and the fractional increment (K) to switch from a VCO frequency of 979.56 MHz to 978.012 Mz. Additionally, the reference divider ratio (M) is reprogrammed to switch the phase detector compare frequency from 240 KHz to 60 KHz, and the phase detector gain is reprogrammed from 0.22 mA/2p to 1.0 mA/2p. The reference frequency oscillator and VCO tuning sensitivity remain constant. In order for the phase lock loop dynamics to be maintained, the phase margin at the 0-dB cross over of the open loop gain must be maintained, and the closed loop bandwidth must be maintained. The phase margin, open loop gain, and the closed loop response for both the cellular mode and the GPS mode are plotted in FIGS. 16A and 16B. Note that the phase margin and open loop gain are equal for either mode, and the closed loop bandwidth is also identical. Thus, the phase lock loop dynamics will be maintained from the cellular mode to the GPS mode.

In the event that the frequency synthesis mechanism 160 employs a fractional-N digital frequency synthesizer, as described above, aspects of the PLL circuit 162 can also be changed to compensate for reprogramming of the fractional-N frequency synthesizer device from the wireless transceiver mode to the GPS mode in order to maintain desirable loop performance. However, such a change in the programming of PLL variables can result in poor compensation in many fractional-N frequency synthesizers, and thus, the rejection of the fractional-N spurious signals. Therefore, the present invention provides for the altering of fraction-N compensation measures from the GPS mode to the wireless transceiver mode in order to maintain suppression of the fractional-N spurious signals. For example, the compensation current reference resistance can be changed via switch 247 (FIG. 9) of the main frequency synthesizer 192 when switching from the wireless transceiver mode to the GPS mode.

C. Radio Frequency Control Signal Embodiment

Figure 10:
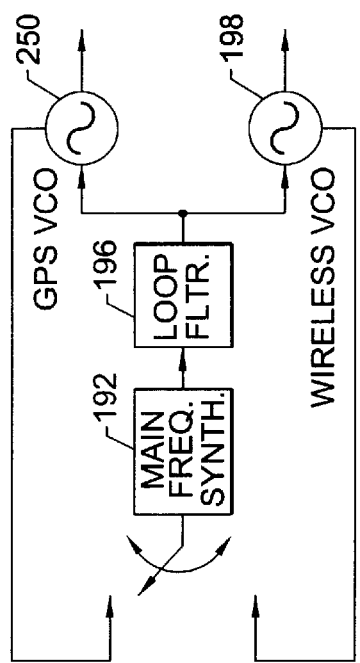
FIG. 10 is a schematic block diagram illustrating a frequency synthesizer mechanism in accordance with a third embodiment of the present invention.

In this embodiment of the present invention, the frequency reference signal is a radio frequency control signal generated by the main frequency synthesizer 192 and the first loop filter 196, and provided to the GPS receiver 170 by link 184''', as generally illustrated in FIG. 10. The radio frequency control signal on link 184''' is utilized to control the operation of a radio frequency oscillator 250 of the GPS receiver 170. The radio frequency oscillator 250 generates local oscillator frequencies and other frequencies necessary for the signal processing by the GPS receiver 170. The radio frequency control signal on link 184''' may be provided to the GPS radio frequency oscillator 250 as follows: The GPS radio frequency oscillator 250 is turned off or the output frequency of the radio frequency oscillator 250 is not used while the wireless mobile terminal is in the cellular mode. Additionally, the cellular radio frequency oscillator 198 is not used while the wireless mobile terminal is in the GPS mode. In this embodiment, the output of the loop filter is wired together, and the frequency synthesizer and loop filter can control either VCO depending upon which mode the wireless mobile terminal is in.

Figure 11:
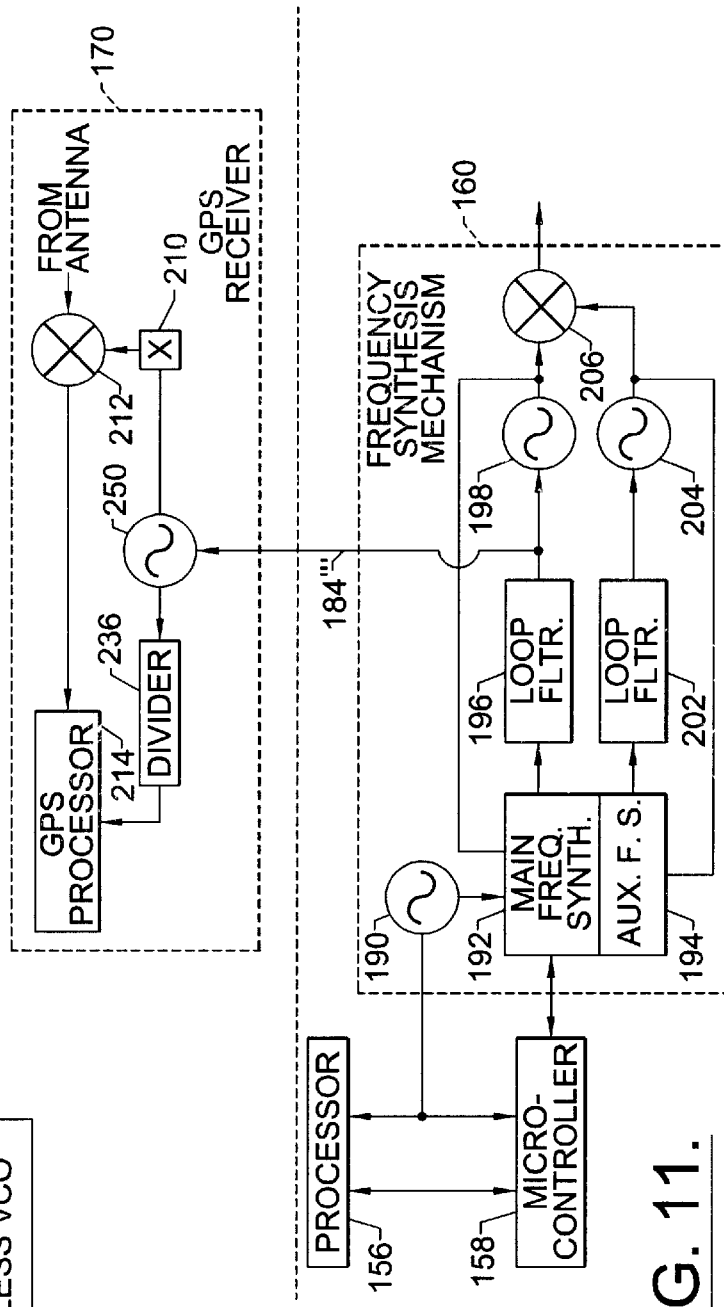
FIG. 11 is a schematic block diagram of the functional components of a wireless mobile terminal in accordance with the third embodiment of the present invention, wherein a signal-conversion GPS receiver is shown.

With reference to FIGS. 11 and 12, specific implementations of the present embodiment are provided. In FIG. 11, the output of the radio frequency oscillator 250 is multiplied by an integer multiple at block 252 to create a first local oscillator for a conversion to a first intermediate frequency at mixer 212. In addition, as with the previous embodiments, the output of the radio frequency oscillator 250 can be divided at block 236 to create a frequency necessary for other signal processing, such as but not limited to an analog-to-digital converter sampling signal at GPS processor 214.

In FIG. 12, the output of the radio frequency oscillator 250 can also be divided at block 258 to a lower frequency to create a second local oscillator for a conversion to a second intermediate frequency at mixer 242 for signal processing by the GPS processor 214. At second block 262, the output of the radio frequency oscillator 250 is divided to create a frequency necessary for other signal processing, such as but not limited to and analog-to-digital converter sampling signal.

In the present embodiment, the radio frequency oscillator 250 is controlled to a specified frequency by the radio frequency control signal generated by main frequency synthesizer 192 and the loop filter 196 of the frequency synthesis mechanism 160. As mentioned above, the PLL circuit 162 (FIG. 9) alternately operates in the wireless transceiver mode and the GPS mode. Therefore, the main frequency synthesizer 192 of the PLL circuit 162 is actively reprogrammed between the wireless transceiver mode and the GPS mode, which can change the loop response of the PLL circuit 162. Examples of the changes made when reprogramming the main frequency synthesizer 192 from the wireless transceiver mode to the GPS mode include a change of the divide ratios N and M and/or a change of the fractional-N ratio F and fractional increment K for generating a different comparison frequency in the digital phase detector 245. To compensate for the resulting changes in the loop response, aspects of the PLL circuit 162, such as the phase detector gain ($I_{PD}$) or the loop filter characteristics (via switch 246), can be changed to achieve the desired loop response. Thus, the desired phase margin (or dampening factor) and PLL loop bandwidth can be substantially maintained.

In the event that the frequency synthesis mechanism 160 employs a fractional-N digital frequency synthesizer, aspects of the PLL circuit 162 can be changed to compensate for reprogramming of the main frequency synthesizer 192 from the wireless transceiver mode to the GPS mode in order to maintain desirable loop performance. However, such a change in the programming of PLL variables can result in poor compensation in many fractional-N frequency synthesizers, and thus, the rejection of the fractional-N spurious signals. Therefore, as mentioned above with reference to the previous embodiment, the present invention provides for the altering of fraction-N compensation measures from the GPS mode to the cellular transceiver mode in order to maintain suppression of the fractional-N spurious signals. For example, the compensation current reference resistance can be changed via switch 247 (FIG. 9) when switching from the wireless transceiver mode to the GPS mode.

For illustrative purposes, the following is an example of a change from the wireless transceiver mode to the GPS mode in the wireless mobile terminal configuration of FIG. 12. In the wireless transceiver mode, the frequency reference oscillator 190 operates at 19.44 MHZ, the main frequency synthesizer 192 operates at 240 kilohertz (KHz), the fractional count of the main frequency synthesizer 192 is ⅛, and the auxiliary frequency synthesizer 194 operates at 240 KHz. Once changed to the GPS mode, the frequency reference oscillator 190 operates at 19.44 MHZ, the main frequency synthesizer 192 operates at 120 KHz, the fractional count of the main frequency synthesizer 192 is ⅕, the auxiliary frequency synthesizer 194 operates at 240 KHz, and the GPS radio frequency oscillator 250 operates at 548.328 MHZ. In addition, in either mode, the GPS radio frequency input frequency is 1575.42 MHZ, the first intermediate frequency is 3×548.328 MHZ−1575.42 MHZ=69.564 MHZ, the divide ratio at block 258 is 8, the divide ratio at block 262 is 134, the second intermediate frequency is (69.564 MHZ−548.328 MHZ)/8=1.023 MHZ, and the sampling frequency is 548.328 MHZ/134=4.092 MHZ.

Figure 17:
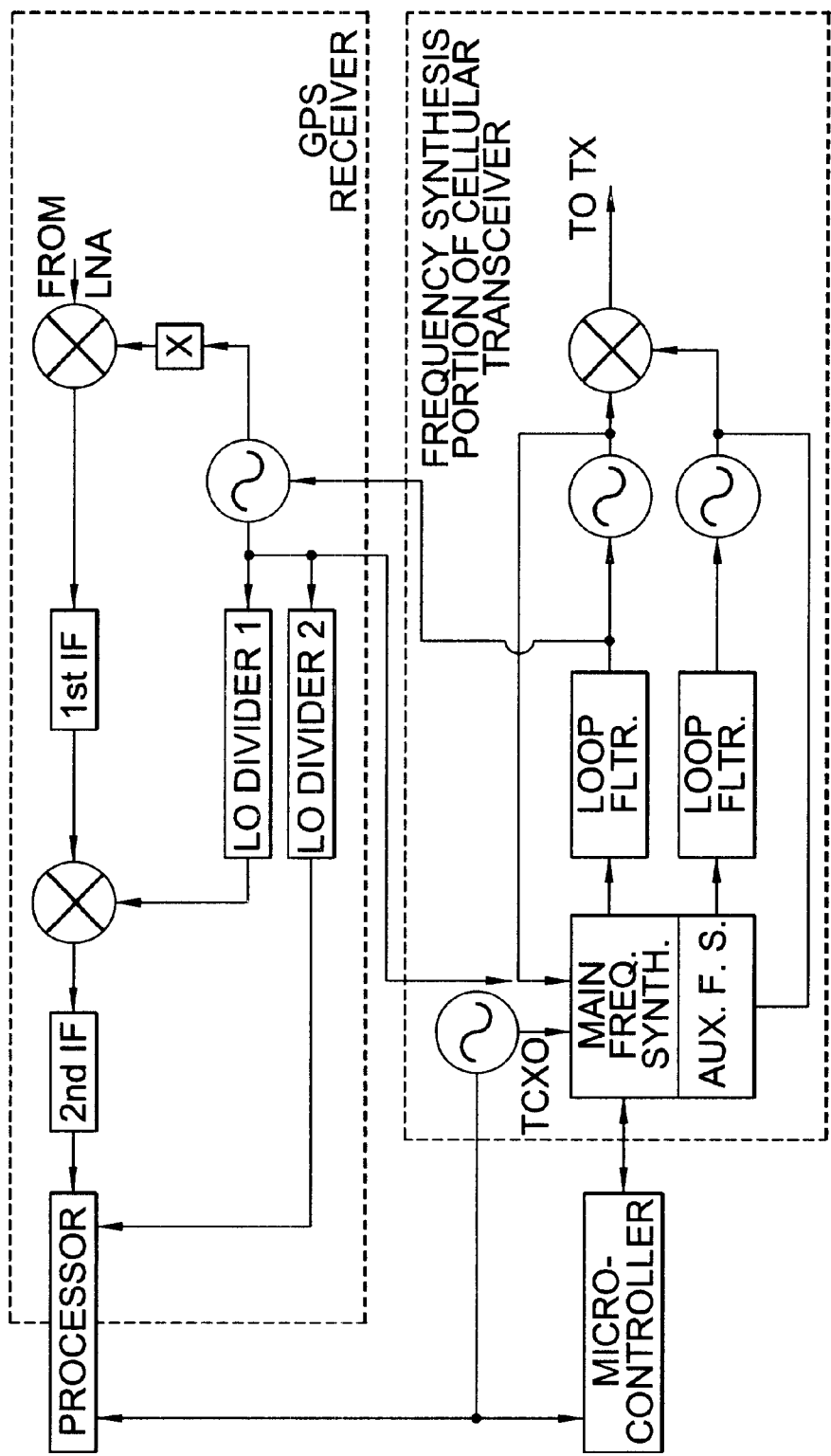
FIG. 17 is a schematic block diagram of an example of a wireless mobile terminal in accordance with FIG. 9.
Figure 18A:
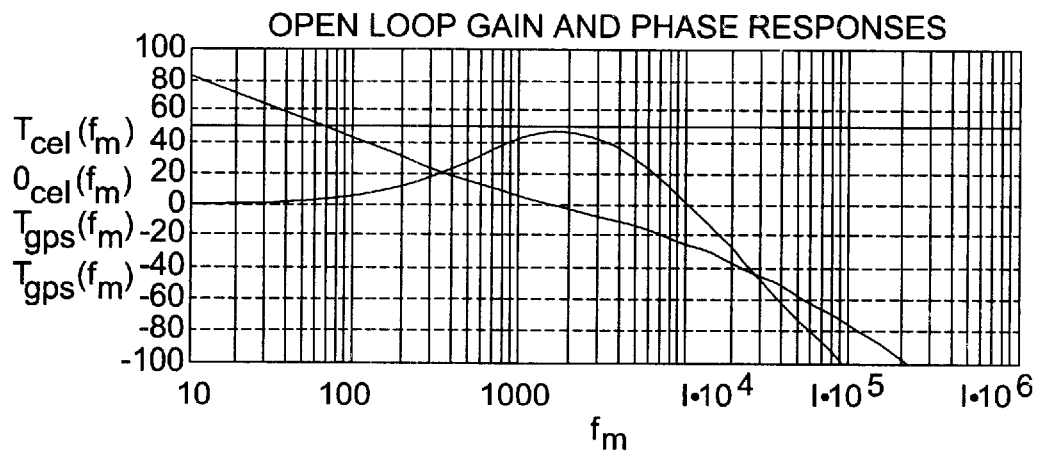
FIGS. 18A and 18B graphically illustrate open loop and closed loop response for the embodiment of FIG. 17.
Figure 18B:
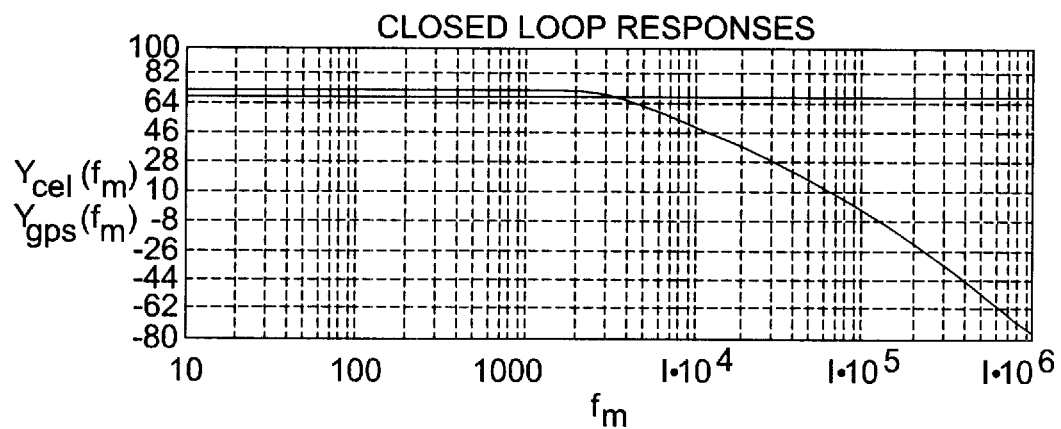

Examples of the embodiment just described are provided in FIGS. 17 and 18. FIG. 17 is an illustration of the example described in the previous paragraph of the means for maintaining the desired phase lock loop dynamics (lock time, overshoot, etc.) when switching between the cellular and the GPS modes. The phase margin, open loop gain, and closed loop response for both the cellular mode and the GPS mode are plotted in FIGS. 18A and 18B. Note that the phase margin and open loop gain are equal for either mode, and the closed loop bandwidth is also identical. Thus, the phase lock loop dynamics can be maintained from the cellular mode to the GPS mode.

II. Operation

The preferred operation and sequence of events corresponding with the wireless mobile terminal 150 and associated methodology are described hereafter.

In accordance with a method of the present invention, a wireless mobile terminal 150 can provide for the sharing of a frequency reference signal between a wireless communication transceiver and a GPS receiver by the following steps, as illustrated in the flow chart of FIG. 13. First, at Block 270, a frequency reference signal is generated by a first subsystem of a wireless mobile terminal 150. As illustrated above in the disclosed embodiments, the frequency reference signal is preferably generated by the wireless communication subsystem 152, and more particularly, the frequency synthesis mechanism 160. Second, at Block 272, the potential frequency error of the wireless mobile terminal's reference frequency oscillator is corrected by locking to the very accurate carrier frequency of the wireless communication system's base station. Next, the frequency reference signal is provided to a second subsystem of the wireless mobile terminal 150. Similarly, as described above, in the disclosed embodiments, the frequency reference signal is provided to the GPS receiver 170 for signal processing and demodulation. However, it is noted that the frequency reference signal can be generated by the GPS receiver 170 and shared with the wireless communication subsystem 152. It will also be understood that between Blocks 270 and 272, and operation to remove frequency error in the reference frequency oscillator by locking to the accurate carrier of the base station of the wireless communication system may be provided.

In addition, the above method can include the step of multiplying the frequency reference signal by an integer value for use in signal processing at the second subsystem. Similarly, the above method can include the step of dividing the frequency reference signal by an integer value for use in signal processing at the second subsystem. Further, the above method can include the step of alternating the operation of the frequency synthesis mechanism 162 between a wireless transceiver mode and a GPS mode.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A wireless mobile terminal for a wireless communications system, comprising:
    a wireless transceiver including a wireless local oscillator that is responsive to a radio frequency control signal, said wireless local oscillator receiving said radio frequency control signal at an input terminal thereof; and
    a global positioning system (GPS) receiver including:
        a GPS local oscillator that is separate from the wireless local oscillator and is responsive to said radio frequency control signal, said GPS local oscillator receiving said radio frequency control signal at an input terminal thereof,
        a multiplier that multiplies a first GPS local oscillator signal that is output from said GPS local oscillator by a first integer to produce a second GPS local oscillator signal; and
        a mixer that is responsive to the second GPS local oscillator signal and a GPS satellite signal aid generates a first output signal having an intermediate frequency.

2. The wireless mobile terminal of claim 1, wherein said wireless mobile terminal includes a phase locked loop circuit, said phase locked loop circuit including a frequency synthesizer and a loop filter.

3. The wireless mobile terminal of claim 1, wherein said GPS receiver further comprises;
    a divider, and wherein said first GPS local oscillator signal is divided by a second integer at said divider to produce a third GPS local oscillator signal; and
    a second mixer that is responsive to the first output signal and the third GPS local oscillator signal and generates a second output signal used in signal processing by said GPS receiver.

4. The wireless mobile terminal of claim 1, wherein said GPS receiver further comprises a divider, and wherein said first GPS local oscillator signal is divided by a second integer at said divider to produce a third GPS local oscillator signal used in signal processing by said GPS receiver.

5. The wireless mobile terminal of claim 4, wherein said third GPS local oscillator signal is an analog-to-digital sampling signal used by said GPS receiver.

6. The wireless mobile terminal of claim 1, wherein said wireless local oscillator outputs a wireless frequency signal, and wherein said wireless frequency signal is used by said wireless transceiver as a transmit carrier signal.

7. The wireless mobile terminal of claim 1, wherein said wireless local oscillator includes a frequency synthesizer that operates alternately in a wireless mode and a GPS mode.

8. The wireless mobile terminal of claim 7, wherein said wireless mode has a first fractional count and said GPS mode has a second fractional count.

9. The wireless mobile terminal of claim 8, wherein said first fractional count is approximately $\frac{1}{5}$ and said second fractional count is approximately $\frac{1}{8}$.

10. A method for sharing a radio frequency control signal in a wireless mobile terminal between a wireless transceiver and a global positioning system (GPS) receiver, comprising the steps of:
    generating said radio frequency control signal at one of said wireless transceiver and said GPS receiver, said wireless transceiver having a wireless local oscillator and said GPS receiver having a GPS local oscillator that is separate from the wireless local oscillator;
    receiving said radio frequency control signal at an input terminal of said wireless local oscillator and at an input terminal of said GPS local oscillator;

controlling said wireless local oscillator at said wireless transceiver using said radio frequency control signal;

controlling said GPS local oscillator at said GPS receiver using said radio frequency control signal;

generating a first GPS local oscillator signal by said GPS local oscillator; and multiplying said first GPS local oscillator signal by an integer to produce a second GPS local oscillator signal used in signal processing.

11. The method of claim 10, further comprising the steps of:

generating said radio frequency control signal at one of said wireless transceiver and said GPS receiver using a frequency synthesizer; and alternating operation of said frequency synthesizer between a wireless transceiver mode and a GPS mode.

12. The method of claim 10, further including the step of locking to a base station carrier to remove frequency error in said radio frequency control signal.

13. A method for sharing a radio frequency control signal in a wireless mobile terminal between a wireless transceiver and a global positioning system (GPS) receiver, comprising the steps of:

generating said radio frequency control signal at one of said wireless transceiver and said GPS receiver, said wireless transceiver having a wireless local oscillator and said GPS receiver having a GPS local oscillator that is separate from the wireless local oscillator;

receiving said radio frequency control signal at an input terminal of said wireless local oscillator and at an input terminal of said GPS local oscillator;

controlling said wireless local oscillator at said wireless transceiver using said radio frequency control signal;

controlling said GPS local oscillator at said GPS receiver using said radio frequency control signal;

generating a first GPS local oscillator signal by said GPS local oscillator; and dividing said first GPS local oscillator signal by an integer to produce a second GPS local oscillator signal used in signal processing.

\* \* \* \* \*